United States Patent
Cymbal et al.

(10) Patent No.: US 7,681,423 B2
(45) Date of Patent: Mar. 23, 2010

(54) COLUMN LOCK ASSEMBLY

(75) Inventors: William D. Cymbal, Freeland, MI (US); Douglas P. Wendling, Chesaning, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/046,238

(22) Filed: Mar. 11, 2008

(65) Prior Publication Data

US 2009/0229325 A1    Sep. 17, 2009

(51) Int. Cl.
 *B60R 25/02* (2006.01)
(52) U.S. Cl. .............................. 70/186; 70/252; 70/422; 70/248
(58) Field of Classification Search ............ 70/182–186, 70/248, 252, 422
See application file for complete search history.

(56) References Cited

U.S. PATENT DOCUMENTS

| 3,566,633 | A |   | 3/1971 | Borck |
| 3,566,634 | A |   | 3/1971 | Borck |
| 4,750,380 | A |   | 6/1988 | Hoblingre et al. |
| 4,991,458 | A |   | 2/1991 | Stuedemann |
| 5,092,145 | A | * | 3/1992 | Haldric et al. ................. 70/185 |
| 5,590,565 | A | * | 1/1997 | Palfenier et al. .............. 74/493 |
| 6,094,951 | A |   | 8/2000 | Cusati |
| 7,010,996 | B2 | * | 3/2006 | Schick et al. ................. 74/492 |
| 7,107,801 | B2 | * | 9/2006 | Chartrain et al. ............. 70/185 |
| 2004/0020249 | A1 | * | 2/2004 | Battermann et al. ........... 70/186 |
| 2006/0272370 | A1 | * | 12/2006 | Yamada et al. ................. 70/186 |

FOREIGN PATENT DOCUMENTS

| EP |       0634310 |       1/1995 |
| EP |       0644091 |       3/1995 |

\* cited by examiner

*Primary Examiner*—Suzanne D Barrett
(74) *Attorney, Agent, or Firm*—Cantor Colburn LLP

(57) ABSTRACT

A column lock assembly for a vehicle including a steering shaft rotatable about a longitudinal axis is disclosed. A first abutment defining a plurality of recesses and a second abutment are mounted to the steering shaft. A sleeve is disposed between the abutments with a locking member movable between a locked position preventing rotation of the sleeve and an unlocked position allowing rotation of the sleeve. The sleeve includes a body portion and a first protrusion engaging one of the recesses to couple the sleeve to the steering shaft for concurrent rotation about the longitudinal axis with the body portion being deformable along the longitudinal axis to move the first protrusion from one of the recesses to an other one of the recesses for allowing rotation of the steering shaft relative to the sleeve when the locking member is in the locked position.

20 Claims, 3 Drawing Sheets

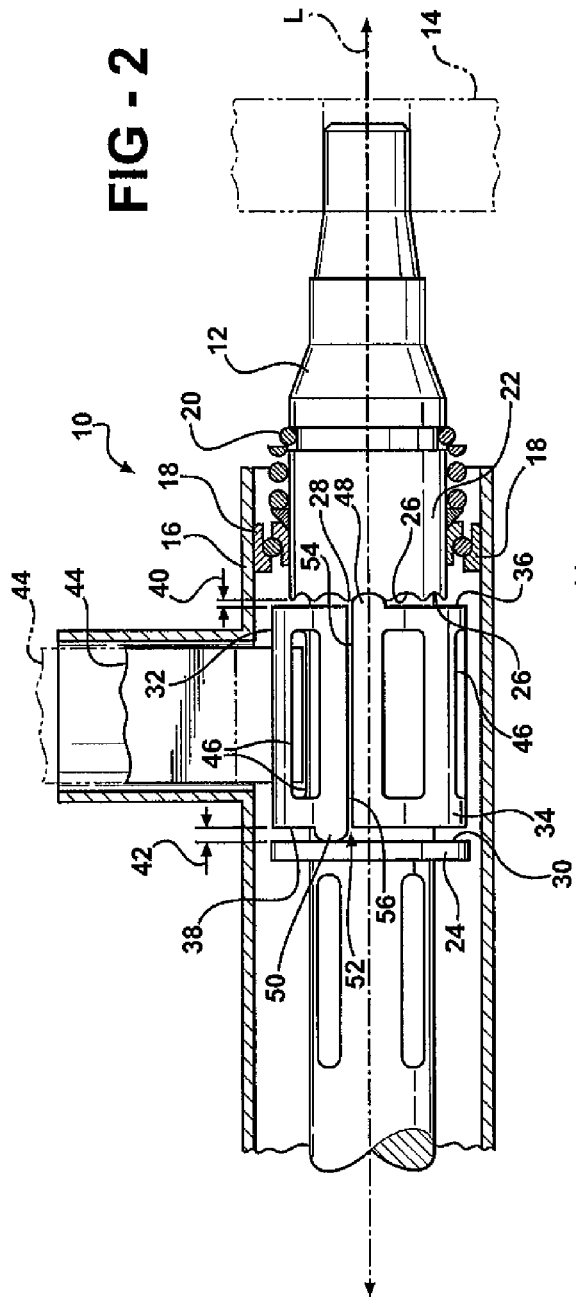
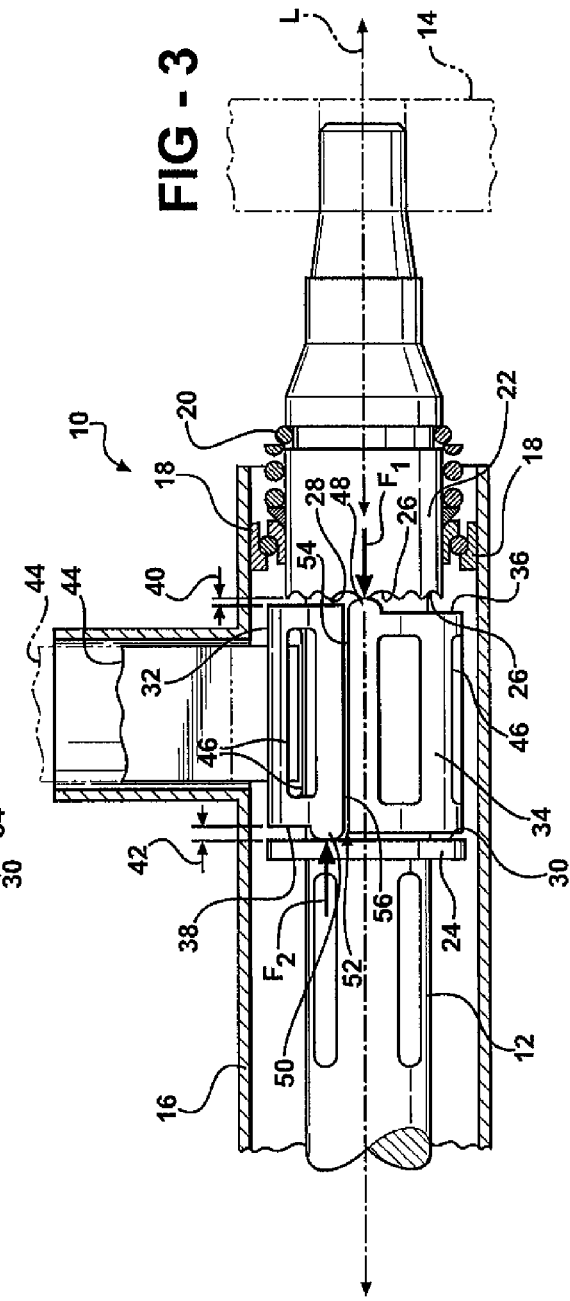

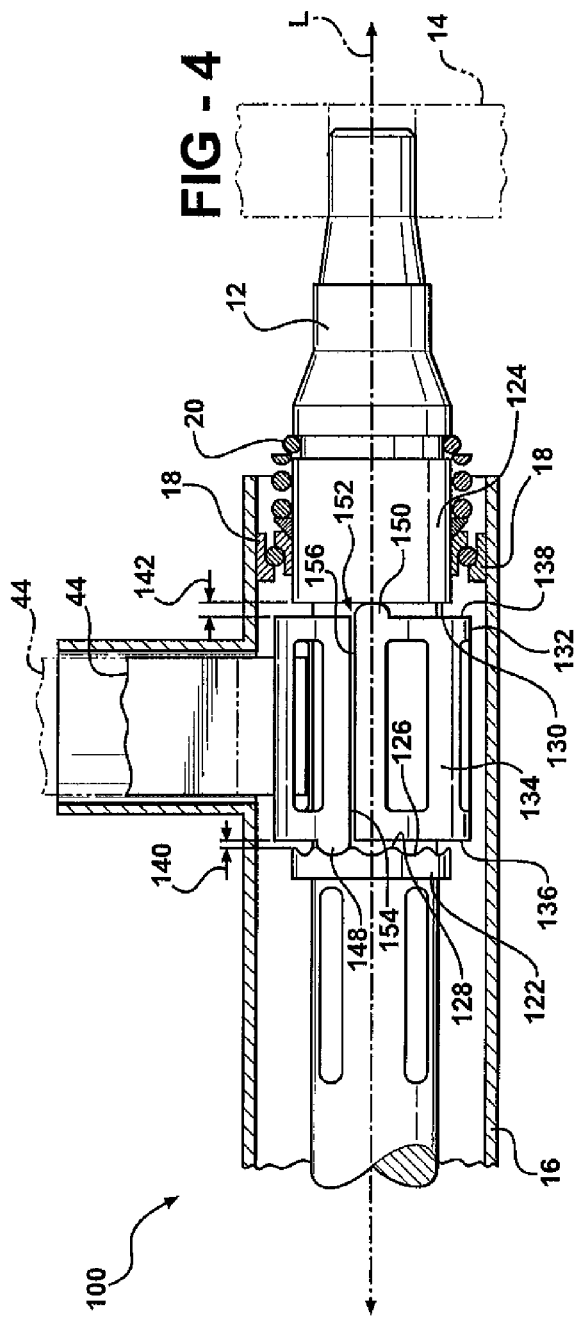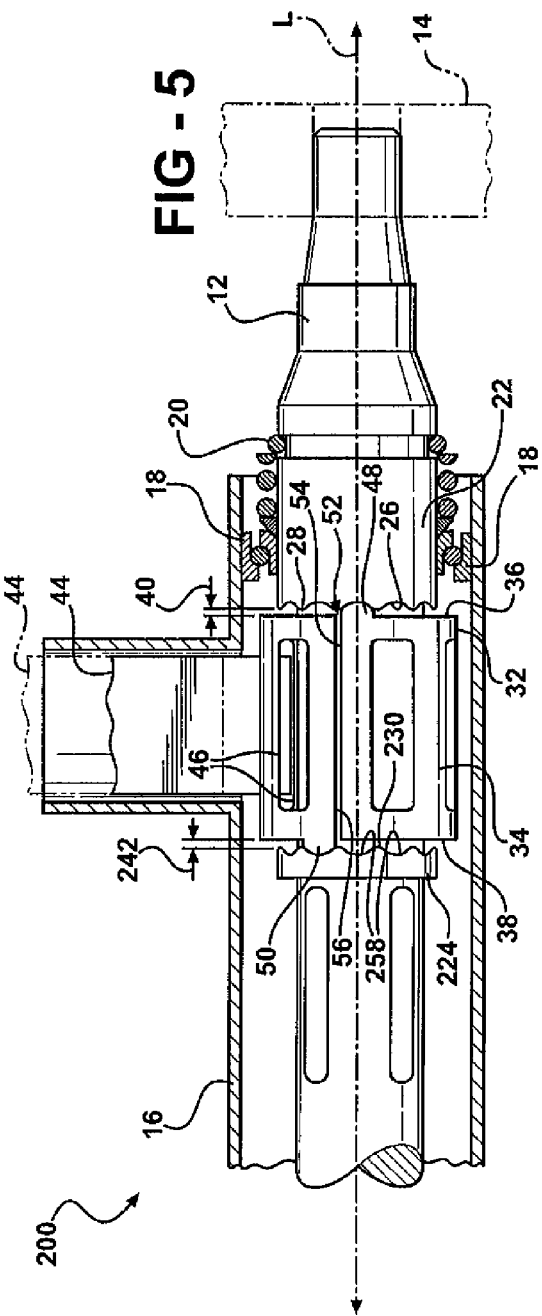

COLUMN LOCK ASSEMBLY

BACKGROUND OF THE INVENTION

1. Field of the Invention

The present invention relates to a column lock assembly for a vehicle.

2. Description of the Prior Art

Typically vehicles are equipped with column lock assemblies for preventing rotation of a steering shaft about a longitudinal axis when an ignition is turned off. A sleeve is disposed about the steering shaft with a locking member engaging the sleeve when the ignition in turned off for preventing rotation of both the sleeve and the steering shaft. Some of these column lock assemblies are also designed to allow the steering shaft to slip relative to the sleeve when a predetermined torque is applied to the steering shaft for preventing damage to the column lock assembly. A first abutment and a second abutment are mounted to the steering shaft with the sleeve disposed therebetween. The sleeve engages one of the first and second abutments for allowing the sleeve to rotate with the steering shaft when the locking member is disengaged from the sleeve. A spring is disposed proximal to the sleeve and biases to move the sleeve along the longitudinal axis when the locking member engages the sleeve thus allowing the steering shaft to rotate or slip relative to the sleeve.

Therefore there remains a need to develop a column lock assembly having a sleeve for preventing rotation of a steering shaft when a locking member engages the sleeve with a body portion of the sleeve deformable along a longitudinal axis for allowing the steering shaft to rotate relative to the sleeve.

SUMMARY OF THE INVENTION AND ADVANTAGES

The present invention provides for a column lock assembly for a vehicle including a steering shaft defining a longitudinal axis and rotatable about the longitudinal axis. The column lock assembly further includes a first abutment and a second abutment mounted to the steering shaft and spaced from each other along the longitudinal axis with the first abutment defining a plurality of recesses. A sleeve is disposed about the steering shaft between the first and second abutments and selectively rotatable about the longitudinal axis. A locking member is movable between a locked position engaging the sleeve for preventing rotation of the sleeve about the longitudinal axis and an unlocked position disengaged from the sleeve for allowing rotation of the sleeve about the longitudinal axis. The sleeve includes a body portion and a first protrusion extending from the body portion with the first protrusion engaging one of the recesses of the first abutment to couple the sleeve to the steering shaft for concurrent rotation about the longitudinal axis. The body portion is deformable along the longitudinal axis to move the first protrusion from one of the recesses to an other one of the recesses for allowing rotation of the steering shaft relative to the sleeve when the locking member is in the locked position.

The present invention therefore provides for a sleeve having a body portion deformable along the longitudinal axis when a locking member is in a locked position for allowing a steering shaft to rotate or slip relative to the sleeve to prevent damage to the assembly. The body portion is deformable as a first protrusion moves from one of a plurality of recesses to an other one of the recesses with the body portion returning to an original configuration when the first protrusion rests in one of the recesses. In other words, the body portion is elastically deformable such that the sleeve biases like a spring, thus eliminating the need for a separate spring which also reduces costs of manufacturing and assembling. Further, the sleeve is disposed about the steering shaft such that the sleeve will function properly when the sleeve either abuts the steering shaft or is spaced from the steering shaft, thus reducing tolerance requirements between the steering shaft and the sleeve which also reduces costs of manufacturing and assembling.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a partial cross-sectional side view of the column lock assembly having the locking member engaging the sleeve as shown in solid lines and the locking member disengaged from the sleeve as shown in phantom lines with a first abutment spaced closer to a steering wheel than a second abutment;

FIG. 3 is a side view of a first protrusion of the sleeve abutting an end surface of the first abutment at a maximum amount of biasing of a body portion;

FIG. 4 is a partial cross-sectional side view of a column lock assembly of a second embodiment having a locking member engaging a sleeve as shown in solid lines and the locking member disengaged from the sleeve as shown in phantom lines with a first abutment spaced farther away from the steering wheel than a second abutment; and FIG. 5 is a partial cross-sectional side view of a column lock assembly of a third embodiment having a locking member engaging a sleeve as shown in solid lines and the locking member disengaged from the sleeve as shown in phantom lines with a first abutment defining a plurality of recesses and a second abutment defining a plurality of notches.

DETAILED DESCRIPTION OF THE INVENTION

Figure 1:
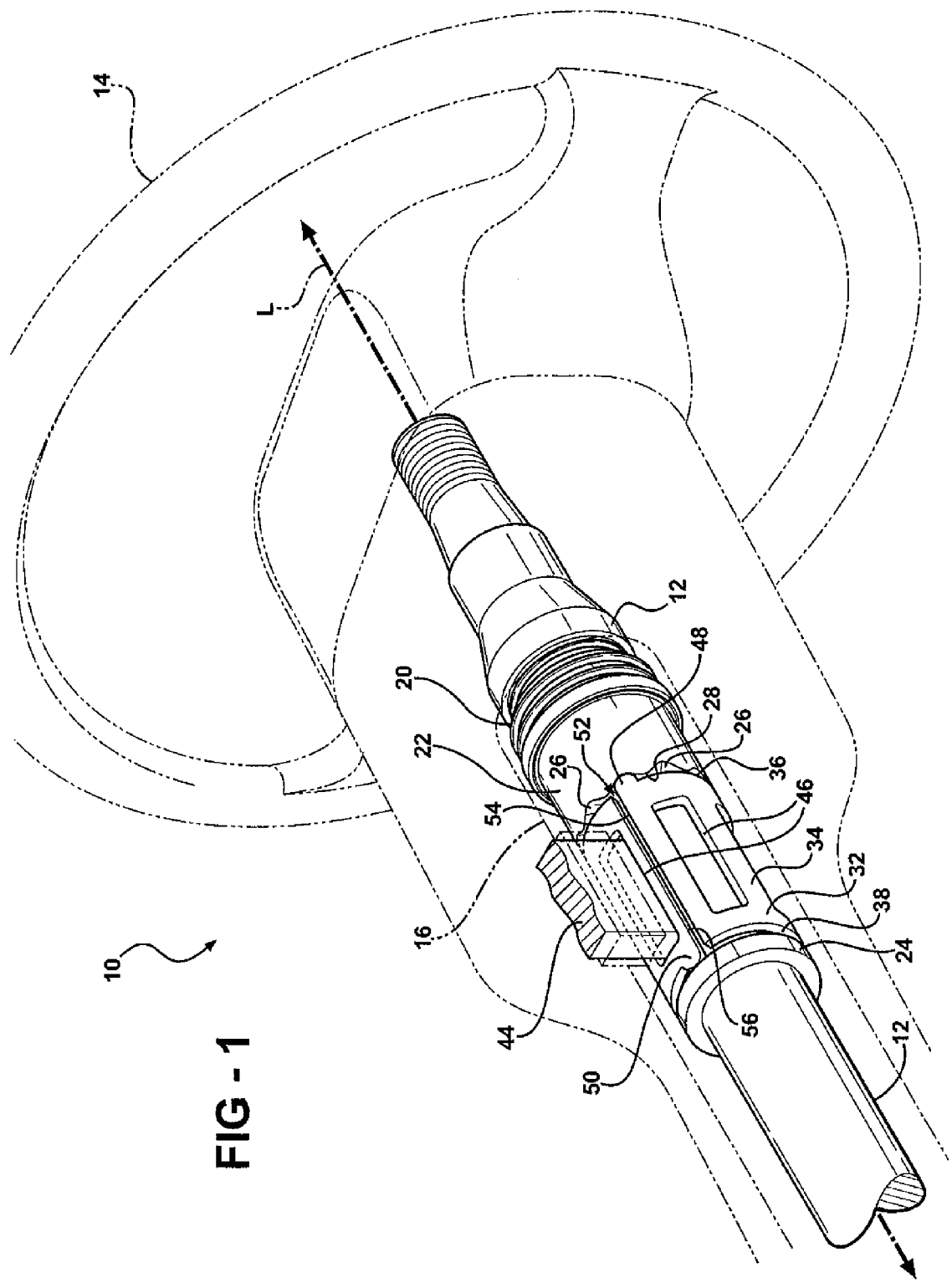
FIG. 1 is a perspective view of a column lock assembly having a locking member engaging a sleeve.

Referring to the Figures, wherein like numerals indicate like or corresponding parts throughout the several views, a column lock assembly 10 for a vehicle (not shown) is generally shown in FIGS. 1-3.

Referring to FIGS. 1 and 2, the column lock assembly 10 includes a steering shaft 12 defining a longitudinal axis L with the steering shaft 12 rotatable about the longitudinal axis L. A steering wheel 14 is coupled to an end of the steering shaft 12 and rotatable about the longitudinal axis L for allowing a user to steer the vehicle. The steering shaft 12 may also be defined as an inner shaft as known to those of ordinary skill in the art. A column jacket 16 is disposed about the steering shaft 12 for supporting the steering shaft 12 such that the steering shaft 12 is rotatable within the column jacket 16. A plurality of bearings 18 are disposed between the column jacket 16 and the steering shaft 12 for preventing wear between the column jacket 16 and the steering shaft 12. Further, a bearing spring 20 may be disposed about the steering shaft 12 proximal to the bearings 18.

A first abutment 22 and a second abutment 24 are mounted to the steering shaft 12 and spaced from each other along the longitudinal axis L. The first abutment 22 is mounted a first predetermined distance away from the steering wheel 14 and the second abutment 24 is mounted a second predetermined distance away from the steering wheel 14. The first predetermined distance is closer to the steering wheel 14 than the second predetermined distance. In other words, the first abutment 22 is mounted to the steering shaft 12 closer to the steering wheel 14 than the second abutment 24. The first and second abutments 22, 24 may be mounted to the steering shaft 12 by welding, fasteners or any other suitable method known to those of ordinary skill in the art.

The first abutment 22 defines a plurality of recesses 26 having a predetermined depth extending into the first abutment 22 along the longitudinal axis L. More specifically, the first abutment 22 includes an end surface 28 with the recesses 26 of the first abutment 22 extending inwardly from the end surface 28 along the longitudinal axis L. In other words, the recesses 26 extend the predetermined depth into the end surface 28 along the longitudinal axis L. The second abutment 24 includes an inner surface 30 facing the end surface 28 with the inner surface 30 of the second abutment 24 defining a flat profile. It is to be appreciated that the first abutment 22 may be further defined as a first collar and the second abutment 24 may be further defined as a second collar or a washer as known to those of ordinary skill in the art.

A sleeve 32 is disposed about the steering shaft 12 between the first and second abutments 22, 24 and is selectively rotatable about the longitudinal axis L. More specifically, the steering shaft 12 defines an outer diameter and the sleeve 32 defines an inner diameter larger than the outer diameter of the steering shaft 12 for disposing the sleeve 32 about the steering shaft 12. The inner diameter of the sleeve 32 may be any suitable diameter such that the sleeve 32 either abuts the steering shaft 12 or the sleeve 32 is spaced from the steering shaft 12 thus reducing tolerance requirements while still allowing the sleeve 32 to function properly. Typically, the sleeve 32 is formed of a metal such as, for example, steel. More typically, the sleeve 32 is formed of a high carbon steel. However it is to be appreciated that the sleeve 32 may be formed of any other suitable material that is capable of providing the necessary strength and biasing ability.

The sleeve 32 includes a body portion 34 having a first end 36 and a second end 38 spaced from the first end 36 along the longitudinal axis L with the first end 36 facing the first abutment 22 and the second end 38 facing the second abutment 24. More specifically, the end surface 28 of the first abutment 22 faces the first end 36 of the sleeve 32 and the inner surface 30 of the second abutment 24 faces the second end 38 of the sleeve 32. The end surface 28 of the first abutment 22 and the first end 36 of the sleeve 32 are spaced from each other to define an opening 40 therebetween and the inner surface 30 of the second abutment 24 and the second end 38 of the sleeve 32 are spaced from each other to define a gap 42 therebetween for allowing the body portion 34 to deform along the longitudinal axis L. Typically, the gap 42 is larger than the opening 40. However it is to be appreciated that the gap 42 may be smaller than the opening 40, the gap 42 and the opening 40 may be the same size, or the opening 40 may be eliminated such that the first end 36 of the body portion 34 abuts the end surface 28 of the first abutment 22. The gap 42 and the opening 40 will be discussed further below.

An ignition (not shown) is coupled to the column jacket 16 for turning the vehicle on and off. The ignition selectively activates a locking member 44 that is movable between a locked position engaging the sleeve 32 for preventing rotation of the sleeve 32 about the longitudinal axis L and an unlocked position disengaged from the sleeve 32 for allowing rotation of the sleeve 32 about the longitudinal axis L. More specifically, when the ignition is on, the locking member 44 is spaced from the sleeve 32 for allowing rotation of the sleeve 32 about the longitudinal axis L and when the ignition is turned off, the locking member 44 engages the sleeve 32 for preventing rotation of the sleeve 32 about the longitudinal axis L.

The body portion 34 of the sleeve 32 defines a plurality of apertures 46 disposed between the first and second ends 36, 38 and extending along the longitudinal axis L. The apertures 46 are spaced from each other such that the apertures 46 selectively receive the locking member 44. As shown in FIG. 2, when the locking member 44 is in the locked position, the locking member 44 is disposed through one of the apertures 46 as shown in the solid lines and when the locking member 44 is in the unlocked position, the locking member 44 is spaced from the sleeve 32 as shown in the phantom lines. It is to be appreciated that the locking member 44 may engage the sleeve 32 anywhere along the body portion 34 when in the locked position, such as for example engaging the sleeve 32 or being disposed through the apertures 46.

The sleeve 32 further includes a first protrusion 48 extending from the body portion 34. More specifically, the first protrusion 48 extends outwardly away from the first end 36 of the body portion 34 to define a predetermined length. The predetermined depth of the recesses 26 and/or the predetermined length of the first protrusion 48 will determine the size of the opening 40 between the end surface 28 of the first abutment 22 and the first end 36 of the sleeve 32. The first protrusion 48 engages one of the recesses 26 of the first abutment 22 to couple the sleeve 32 to the steering shaft 12 for concurrent rotation about the longitudinal axis L when the locking member 44 is in the unlocked position. In addition, the body portion 34 is deformable along the longitudinal axis L to move or bias the first protrusion 48 from one of the recesses 26 to an other one of the recesses 26 for allowing rotation of the steering shaft 12 relative to the sleeve 32 when the locking member 44 is in the locked position, thus the sleeve 32 biases like a spring. More specifically, the body portion 34 is elastically deformable along the longitudinal axis L between the first and second ends 36, 38 such that the body portion 34 deforms along the longitudinal axis L as the first protrusion 48 moves from one of the recesses 26 to the other one of the recesses 26 and the body portion 34 returns to an original configuration when the first protrusion 48 rests in one of the recesses 26. In other words, the body portion 34 is deformable or compressible such that the body portion 34 has the ability to return to the original configuration without permanently deforming the body portion 34.

The sleeve 32 also includes a second protrusion 50 extending from the body portion 34 with the second protrusion 50 engaging the second abutment 24. The second protrusion 50 extends outwardly away from the second end 38 of the body portion 34 to define a predetermined length with the second protrusion 50 engaging or abutting the inner surface 30 of the second abutment 24. More specifically, the second protrusion 50 engages or abuts the flat profile of the inner surface 30 of the second abutment 24. The predetermined length of the second protrusion 50 will determine the size of the gap 42 between the inner surface 30 of the second abutment 24 and the second end 38 of the sleeve 32. Typically, the first protrusion 48 is offset from the second protrusion 50 transverse to the longitudinal axis L.

The body portion 34 further defines a slot 52 partially extending between the first and second ends 36, 38 for allowing the body portion 34 to deform along the longitudinal axis L to bias the first protrusion 48 from one of the recesses 26 to the other one of the recesses 26 when the locking member 44 is in the locked position. The slot 52 is disposed along the longitudinal axis L and is spaced from the apertures 46 of the body portion 34 with the first and second protrusions 48, 50 disposed adjacent the slot 52. More specifically, the slot 52 extends between the first and second ends 36, 38 of the body portion 34 along the longitudinal axis L to define a continuous space for allowing the body portion 34 to deform along the longitudinal axis L to bias the first protrusion 48 from one of the recesses 26 to the other one of the recesses 26 when the locking member 44 is in the locked position.

Also referring to FIG. 3, the body portion 34 includes a first side 54 and a second side 56 spaced from each other to define the slot 52 such that the first side 54 is moveable along the longitudinal axis L independently of the second side 56. When the first side 54 moves along the longitudinal axis L, at least a section of the body portion 34 moves into the gap 42 such that the first side 54 biases independently of the second side 56. In other words, the body portion 34 deforms when the first side 54 moves along the longitudinal axis L such that the first protrusion 48 biases from one of the recesses 26 to the other one of the recesses 26. The section of the body portion 34 is further defined as the second end 38 proximal to the first side 54. More specifically, the section of the body portion 34 is defined as the second end 38 proximal to the first side 54 and spaced from the second protrusion 50. It is to be appreciated that the section of the body portion 34 may be spaced from the first side 54 and/or proximal to the second protrusion 50. Typically, the first protrusion 48 is disposed adjacent the first side 54 of the body portion 34 and the second protrusion 50 is disposed adjacent the second side 56 of the body portion 34 for allowing a maximum amount of deformation or biasing of the body portion 34 along the longitudinal axis L when the locking member 44 is in the locked position. However it is to be appreciated that the first protrusion 48 may be spaced from the first side 54 and the second protrusion 50 may be spaced from the second side 56.

For illustrative purposes only, an example of the locking member 44 moving from the unlocked position disengaged from the sleeve 32 to the locked position engaging the sleeve 32 will be discussed below to illustrate the steering shaft 12 rotating or slipping relative to the sleeve 32 for preventing damage to the assembly 10. When the ignition is turned on, the locking member 44 is in the unlocked position and spaced or disengaged from the sleeve 32 such that the sleeve 32 concurrently rotates with the steering shaft 12 when the steering wheel 14 is rotated about the longitudinal axis L for allowing the user to steer the vehicle. In other words, the sleeve 32 is in an un-biased position when the locking member 44 is in the unlocked position.

When the ignition is turned off, the locking member 44 extends toward the sleeve 32 such that the locking member 44 either engages the sleeve 32 and/or is disposed through one of the apertures 46 of the sleeve 32 for preventing movement of the sleeve 32 which also prevents movement of the steering shaft 12 due to the first protrusion 48 being disposed in one of the recesses 26 of the first abutment 22. The sleeve 32 is still in the un-biased position when the locking member 44 engages the sleeve 32. While the locking member 44 is in the locked position, the steering shaft 12 may be rotated relative to the sleeve 32 when a predetermined torque is applied to the steering shaft 12 thus moving the sleeve 32 from the un-biased position to a biased position. In other words, when the user rotates the steering wheel 14 while the ignition is turned off, the user must overcome the predetermined torque to rotate the steering wheel 14 and thus rotate the steering shaft 12 relative to the sleeve 32. As shown in FIG. 3, the predetermined torque causes the first abutment 22 to apply a first force $F_1$ to the first protrusion 48 and causes the second abutment 24 to apply a second force $F_2$ to the second protrusion 50 which allows the first protrusion 48 to bias along the longitudinal axis L. The body portion 34 deforms or biases along the longitudinal axis L toward the inner surface 30 of the second abutment 24. More specifically, as the first protrusion 48 moves from one of the recesses 26, the slot 52 allows the body portion 34 to deform along the longitudinal axis L with the first side 54 of the body portion 34 moving along the longitudinal axis L independently of the second side 56 of the body portion 34 such that the body portion 34 twists. In other words, the second side 56 does not move along the longitudinal axis L because the second protrusion 50 abuts the flat profile of the second abutment 24. The second protrusion 50 moves along the flat profile as the first protrusion 48 moves from one of the recesses 26 into the other one of the recesses 26. The first protrusion 48 moves out of one of the recesses 26 and abuts the end surface 28 when the first side 54 is at the maximum amount of deformation or biasing of the body portion 34 as shown in FIG. 3. In other words, the second end 38 of the body portion 34 proximal to the first side 54 moves into the gap 42 to bias the first protrusion 48 from one of the recesses 26 to the other one of the recesses 26. It is to be appreciated that the first side 54 proximal to the second end 38 may move inwardly toward the second side 56 and/or outwardly away from the second side 56 when the first protrusion 48 moves out of one of the recesses 26 and into the other one of the recesses 26 depending on whether the steering wheel 14 is rotating clockwise or counter-clockwise. As the first protrusion 48 continues to move into the other one of the recesses 26, the first side 54 continues to move along the longitudinal axis L out of the gap 42 until the first protrusion 48 rests in the other one of the recesses 26. When the first protrusion 48 rests in the other one of the recesses 26, the sleeve 32 is in the un-biased position again. If additional rotation of the steering wheel 14 is required while the locking member 44 is still in the locked position, the predetermined torque would have to be overcome again to allow rotation of the steering shaft 12 relative to the sleeve 32.

Referring to FIG. 4, a second embodiment of a column lock assembly 100 for a vehicle (not shown), wherein like reference numerals indicate like or corresponding parts throughout the several views, is generally shown. Identical or similar components discussed in the first embodiment of the assembly 10 have the same reference numerals in this embodiment and additional or different components of this embodiment of the assembly 100 have different reference numerals. The primary distinction between this embodiment of the assembly 100 and the first embodiment of the assembly 10 is a first abutment 122 and a second abutment 124 are in a reversed orientation. The operation of the second embodiment of the assembly 100 is substantially the same as the operation of the first embodiment of the assembly 10 and will not be re-discussed.

In this embodiment, the first abutment 122 is mounted to the steering shaft 12 farther from the steering wheel 14 than the second abutment 124 with the first abutment defining a plurality of recesses 126. The first abutment 122 is mounted a first predetermined distance away from the steering wheel 14 and the second abutment 124 is mounted a second predetermined distance away from the steering wheel 14. The second predetermined distance is closer to the steering wheel 14 than the first predetermined distance.

A sleeve 132 is disposed about the steering shaft 12 between the first and second abutments 122, 124 and is selectively rotatable about the longitudinal axis L. In this embodiment of the assembly 100, a first end 136 and a second end 138 of a body portion 134 of the sleeve 132 is in a reversed orientation such that the first end 136 is spaced farther away from the steering wheel 14 than the second end 138. The first end 136 faces the first abutment 122 and the second end 138 faces the second abutment 124. More specifically, an end surface 128 of the first abutment 122 faces the first end 136 of the sleeve 132 and an inner surface 130 of the second abutment 124 faces the second end 138 of the sleeve 132. The end surface 128 of the first abutment 122 and the first end 136 of the sleeve 132 are spaced from each other to define an opening 140 therebetween and the inner surface 130 of the second abutment 124 and the second end 138 of the sleeve 132 are spaced from each other to define a gap 142 therebetween for allowing the body portion 134 to deform along the longitudinal axis L. Typically, the gap 142 is larger than the opening 140. However it is to be appreciated that the gap 142 may be smaller than the opening 140, the gap 142 and the opening 140 may be the same size, or the opening 140 may be eliminated such that the first end 136 of the body portion 134 abuts the end surface 128 of the first abutment 122. The gap 142 will be discussed further below.

The sleeve 132 further includes a first protrusion 148 extending from the body portion 134 and a second protrusion 150 extending from the body portion 134. The second protrusion 150 engages the second abutment 124 and more specifically engages the inner surface 130 of the second abutment 124. The body portion 134 further defines a slot 152 partially extending between the first and second ends 136, 138 for allowing the body portion 134 to deform along the longitudinal axis L to bias the first protrusion 148 from one of the recesses 126 to the other one of the recesses 126 when the locking member 44 is in the locked position. More specifically, the slot 152 extends between the first and second ends 136, 138 of the body portion 134 along the longitudinal axis L to define a continuous space for allowing the body portion 134 to deform along the longitudinal axis L to bias the first protrusion 148 from one of the recesses 126 to the other one of the recesses 126 when the locking member 44 is in the locked position. More specifically, the body portion 134 is elastically deformable along the longitudinal axis L between the first and second ends 136, 138 such that the body portion 134 deforms along the longitudinal axis L as the first protrusion 148 moves from one of the recesses 126 to the other one of the recesses 126 and the body portion 134 returns to an original configuration when the first protrusion 148 rests in one of the recesses 126. In other words, the body portion 134 is deformable or compressible such that the body portion 134 has the ability to return to the original configuration without permanently deforming the body portion 134.

The body portion 134 includes a first side 154 and a second side 156 spaced from each other to define the slot 152 such that the first side 154 is moveable along the longitudinal axis L independently of the second side 156. In this embodiment of the assembly 100, the first and second sides 154, 156 are in a reversed orientation from the first embodiment of the assembly 10. When the first side 154 moves along the longitudinal axis L, at least a section of the body portion 134 moves into the gap 142 such that the first side 154 biases independently of the second side 156. In other words, the body portion 134 deforms when the first side 154 moves along the longitudinal axis L such that the first protrusion 148 biases from one of the recesses 126 to the other one of the recesses 126. The section of the body portion 134 is further defined as the second end 138 proximal to the first side 154. More specifically, the section of the body portion 134 is defined as the second end 138 proximal to the first side 154 and spaced from the second protrusion 150. It is to be appreciated that the section of the body portion 134 may be spaced from the first side 154 and/or proximal to the second protrusion 150. Typically, the first protrusion 148 is disposed adjacent the first side 154 of the body portion 134 and the second protrusion 150 is disposed adjacent the second side 156 of the body portion 134 for allowing a maximum amount of deformation or biasing of the body portion 134 along the longitudinal axis L when the locking member 44 is in the locked position. However it is to be appreciated that the first protrusion 148 may be spaced from the first side 154 and the second protrusion 150 may be spaced from the second side 156.

Referring to FIG. 5, a third embodiment of a column lock assembly 200 for a vehicle (not shown), wherein like reference numerals indicate like or corresponding parts throughout the several views, is generally shown. Identical or similar components discussed in the first and second embodiments of the assemblies 10, 100 have the same reference numerals in this embodiment and additional or different components of this embodiment of the assembly 200 have different reference numerals. The primary distinction between this embodiment of the assembly 200 and the first and second embodiments of the assemblies 10, 100 is the configuration of a second abutment 224.

In this embodiment, the sleeve 32 is configured substantially the same as the first embodiment of the assembly 10 and will only be briefly discussed below. The sleeve 32 is disposed between the first and second abutments 22, 224 and includes the body portion 34 having the first end 36 and the second end 38 spaced from the first end 36 along the longitudinal axis L. The first protrusion 48 extends from the first end 36 and the second protrusion 50 extends from the second end 38. The body portion 34 defines the slot 52 partially extending between the first and second ends 36, 38 for allowing the body portion 34 to deform along the longitudinal axis L. More typically, the slot 52 extends between the first and second ends 36, 38 along the longitudinal axis L to define the continuous space for allowing the body portion 34 to deform along the longitudinal axis L.

The first abutment 22 is mounted to the steering shaft 12 closer to the steering wheel 14 than the second abutment 224 as discussed in the first embodiment of the assembly 10. The second abutment 224 defines a plurality of notches 258 having a predetermined depth extending into the second abutment 224 along the longitudinal axis L with the first protrusion 48 disposed in one of the recesses 26 of the first abutment 22 and the second protrusion 50 disposed in one of the notches 258 of the second abutment 224. More specifically, the notches 258 extend inwardly from an inner surface 230 of the second abutment 224 along the longitudinal axis L. In other words, the notches 258 extend the predetermined depth into the inner surface 230 along the longitudinal axis L. The inner surface 230 of the second abutment 224 and the second end 38 of the sleeve 32 define a gap 242 therebetween. Typically, the gap 242 and the opening 40 are the same size. However it is to be appreciated that the gap 242 may be larger than the opening 40 or the gap 242 may be smaller than the opening 40.

The body portion 34 defines the slot 52 partially extending between the first and second ends 36, 38 for allowing the body portion 34 to deform along the longitudinal axis L to bias the first protrusion 48 from one of the recesses 26 to the other one of the recesses 26 and to bias the second protrusion 50 from one of the notches 258 to an other one of the notches 258. More typically, the slot 52 extends between the first and second ends 36, 38 along the longitudinal axis L to define the continuous space for allowing the body portion 34 to deform along the longitudinal axis L to bias the first protrusion 48 from one of the recesses 26 to the other one of the recesses 26 and to bias the second protrusion 50 from one of the notches 258 to the other one of the notches 258. The body portion 34 includes the first side 54 and the second side 56 spaced from each other to define the slot 52 with the first protrusion 48 disposed adjacent the first side 54 and the second protrusion 50 disposed adjacent the second side 56. Movement of the first protrusion 48 from one of the recesses 26 to the other one of the recesses 26 allows the first side 54 to move along the longitudinal axis L in a first direction while the second protrusion 50 moves from one of the notches 258 to the other one of the notches 258 which allows the second side 56 to move along the longitudinal axis L in a second direction opposite the first direction when the locking member 44 is in the locked position. More specifically, the first side 54 moves in the first direction such that the second end 38 proximal to the first side 54 moves into the gap 242 and the second side 56 moves in the second direction such that the first end 36 proximal to the second side 56 moves into the opening 40.

For illustrative purposes only, an example of the locking member 44 moving from the unlocked position disengaged from the sleeve 32 to the locked position engaging the sleeve 32 will be discussed below to illustrate the steering shaft 12 rotating or slipping relative to the sleeve 32 for preventing damage to the assembly 200. When the ignition is turned on, the locking member 44 is in the unlocked position and spaced or disengaged from the sleeve 32 such that the sleeve 32 concurrently rotates with the steering shaft 12 when the steering wheel 14 is rotated for allowing the user to steer the vehicle. In other words, the sleeve 32 is in the un-biased position when the locking member 44 is in the unlocked position.

When the ignition is turned off, the locking member 44 extends toward the sleeve 32 such that the locking member 44 either engages the sleeve 32 or is disposed through one of the apertures 46 of the sleeve 32 for preventing movement of the sleeve 32 which also prevents movement of the steering shaft 12 due to the first protrusion 48 being disposed in one of the recesses 26 of the first abutment 22 and the second protrusion 50 being disposed in one of the notches 258 of the second abutment 224. The sleeve 32 is still in the un-biased position when the locking member 44 engages the sleeve 32. While the locking member 44 is in the locked position, the steering shaft 12 may be rotated relative to the sleeve 32 when the predetermined torque is applied to the steering shaft 12 thus moving the sleeve 32 from the un-biased position to the biased position. In other words, when the user rotates the steering wheel 14 while the ignition is turned off, the user must overcome the predetermined torque to rotate the steering wheel 14 and thus rotate the steering shaft 12 relative to the sleeve 32. The predetermined torque causes the first abutment 22 to apply the first force $F_1$ to the first protrusion 48 and causes the second abutment 224 to apply the second force $F_2$ to the second protrusion 50 which allows the first and second protrusions 48, 50 to bias along the longitudinal axis L. The first force $F_1$ causes the first protrusion 48 to bias along the longitudinal axis L from one of the recesses 26 to the other one of the recesses 26 and the second force $F_2$ causes the second protrusion 50 to bias along the longitudinal axis L from one of the notches 258 to the other one of the notches 258. As the first protrusion 48 moves from one of the recesses 26 and the second protrusion 50 moves from one of the notches 258, the first and second sides 54, 56 move along the longitudinal axis L independently of each other in opposite directions such that the body portion 34 deforms or biases along the longitudinal axis L. In other words, as the first protrusion 48 moves, the first side 54 moves along the longitudinal axis L in the first direction while the second side 56 moves along the longitudinal axis L in the second direction opposite the first direction such that the body portion 34 twists. The first protrusion 48 moves out of one of the recesses 26 and abuts the end surface 28 when the first side 54 is at the maximum amount of deformation or biasing of the body portion 34 and the second protrusion 50 moves out of one of the notches 258 and abuts the inner surface 230 of the second abutment 224 when the second side 56 is at a maximum amount of deformation or biasing of the body portion 34. In other words, the second end 38 of the body portion 34 proximal to the first side 54 moves into the gap 242 to bias the first protrusion 48 from one of the recesses 26 to the other one of the recesses 26 and the first end 36 of the body portion 34 proximal to the second side 56 moves into the opening 40 to bias the second protrusion 50 from one of the notches 258 to the other one of the notches 258. It is to be appreciated that the first side 54 proximal to the second end 38 may move inwardly toward the second side 56 and/or outwardly away from the second side 56 when the first protrusion 48 moves out of one of the recesses 26 and into the other one of the recesses 26 depending on whether the steering wheel 14 is rotating clockwise or counter-clockwise. It is to be further appreciated that the second side 56 proximal to the first end 36 may move inwardly toward the first side 54 and/or outwardly away from the first side 54 when the second protrusion 50 moves out of one of the notches 258 and into the other one of the notches 258 depending on whether the steering wheel 14 is rotating clockwise or counter-clockwise. As the first protrusion 48 continues to move into the other one of the recesses 26, the first side 54 continues to move along the longitudinal axis L out of the gap 242 until the first protrusion 48 rests in the other one of the recesses 26 and simultaneously the second protrusion 50 continues to move along the longitudinal axis L out of the opening 40 until the second protrusion 50 rests in the other one of the notches 258. It is to be appreciated that there may be a delay between the first and second protrusions 48, 50 moving from one of the recesses 26 and one of the notches 258, respectively and into the other one of the recesses 26 and the other one of the notches 258, respectively. Once the first and second protrusions 48, 50 are resting in one of the recesses 26 and one of the notches 258 respectively, the sleeve 32 is in the un-biased position again. If additional rotation of the steering wheel 14 is required while the locking member 44 is still in the locked position, the predetermined torque would have to be overcome again to allow rotation of the steering shaft 12 relative to the sleeve 32.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A column lock assembly for a vehicle, said assembly comprising:
   a steering shaft defining a longitudinal axis and rotatable about said longitudinal axis;
   a first abutment and a second abutment mounted to said steering shaft and spaced from each other along said longitudinal axis with said first abutment defining a plurality of recesses;
   a sleeve disposed about said steering shaft between said first and second abutments and selectively rotatable about said longitudinal axis;
   a locking member movable between a locked position engaging said sleeve for preventing rotation of said sleeve about said longitudinal axis and an unlocked position disengaged from said sleeve for allowing rotation of said sleeve about said longitudinal axis; and said sleeve including a body portion and a first protrusion extending from said body portion with said first protrusion engaging one of said recesses of said first abutment to couple said sleeve to said steering shaft for concurrent rotation about said longitudinal axis and said body portion being deformable along said longitudinal axis to move said first protrusion from one of said recesses to an other one of said recesses for allowing rotation of said steering shaft relative to said sleeve when said locking member is in said locked position.

2. An assembly as set forth in claim 1 wherein said body portion of said sleeve includes a first end and a second end spaced from said first end along said longitudinal axis with said first end facing said first abutment and said second end facing said second abutment and said body portion being elastically deformable along said longitudinal axis between said first and second ends.

3. An assembly as set forth in claim 2 wherein said body portion defines a slot partially extending between said first and second ends for allowing said body portion to deform along said longitudinal axis to bias said first protrusion from one of said recesses to said other one of said recesses when said locking member is in said locked position.

4. An assembly as set forth in claim 3 wherein said slot extends between said first and second ends along said longitudinal axis to define a continuous space for allowing said body portion to deform along said longitudinal axis to bias said first protrusion from one of said recesses to said other one of said recesses when said locking member is in said locked position.

5. An assembly as set forth in claim 3 wherein said body portion includes a first side and a second side spaced from each other to define said slot such that movement of said first protrusion from one of said recesses to an other one of said recesses allows said first side to move along said longitudinal axis independently of said second side.

6. An assembly as set forth in claim 3 wherein said body portion of said sleeve defines a plurality of apertures disposed between said first and second ends and spaced from each other and spaced from said slot for selectively receiving said locking member.

7. An assembly as set forth in claim 5 wherein said sleeve includes a second protrusion engaging said second abutment with said first protrusion extending outwardly away from said first end of said body portion and said second protrusion extending outwardly away from said second end of said body portion.

8. An assembly as set forth in claim 7 wherein said first protrusion is offset from said second protrusion transverse to said longitudinal axis.

9. An assembly as set forth in claim 7 wherein said first protrusion is disposed adjacent said first side and said second protrusion is disposed adjacent said second side for allowing a maximum amount of biasing of said body portion.

10. An assembly as set forth in claim 2 wherein said second abutment includes an inner surface facing said second end of said sleeve with said inner surface and said second end spaced from each other to define a gap therebetween for allowing said body portion to deform along said longitudinal axis toward said inner surface when said locking member is in said locked position.

11. An assembly as set forth in claim 10 wherein said first abutment includes an end surface facing said first end of said sleeve and said recesses extending inwardly from said end surface along said longitudinal axis with said end surface and said first end spaced from each other to define an opening therebetween.

12. An assembly as set forth in claim 11 wherein said gap is larger than said opening.

13. An assembly as set forth in claim 1 wherein said sleeve includes a second protrusion extending from said body portion with said second protrusion engaging said second abutment such that said first abutment applies a first force to said first protrusion and said second abutment applies a second force to said second protrusion to bias said first protrusion along said longitudinal axis from one of said recesses to an other one of said recesses when said locking member is in said locked position.

14. An assembly as set forth in claim 13 wherein said first protrusion is offset from said second protrusion transverse to said longitudinal axis.

15. An assembly as set forth in claim 13 wherein said second abutment defines a plurality of notches with said first protrusion disposed in one of said recesses of said first abutment and said second protrusion disposed in one of said notches of said second abutment.

16. An assembly as set forth in claim 15 wherein said body portion of said sleeve includes a first end and a second end spaced from said first end along said longitudinal axis and wherein said body portion defines a slot partially extending between said first and second ends for allowing said body portion to deform along said longitudinal axis to bias said first protrusion from one of said recesses to said other one of said recesses and to bias said second protrusion from one of said notches to an other one of said notches when said locking member is in said locked position.

17. An assembly as set forth in claim 16 wherein said slot extends between said first and second ends along said longitudinal axis to define a continuous space for allowing said body portion to deform along said longitudinal axis to bias said first protrusion from one of said recesses to said other one of said recesses and to bias said second protrusion from one of said notches to an other one of said notches when said locking member is in said locked position.

18. An assembly as set forth in claim 16 wherein said body portion includes a first side and a second side spaced from each other to define said slot such that movement of said first protrusion from one of said recesses to said other one of said recesses allows said first side to move along said longitudinal axis in a first direction while said second protrusion moves from one of said notches to an other one of said notches which allows said second side to move along said longitudinal axis in a second direction opposite said first direction when said locking member is in said locked position.

19. An assembly as set forth in claim 18 wherein said first protrusion is disposed adjacent said first side and said second protrusion is disposed adjacent said second side for allowing a maximum amount of biasing of said body portion.

20. An assembly as set forth in claim 1 wherein said body portion is elastically deformable between said first and second ends such that said body portion deforms along said longitudinal axis as said first protrusion moves from one of said recesses to said other one of said recesses and said body portion returning to an original configuration when said first protrusion rests in said other one of said recesses.

* * * * *